US005091253A

United States Patent [19]

Smith et al.

[11] Patent Number: 5,091,253

[45] Date of Patent: Feb. 25, 1992

[54] MAGNETIC CORES UTILIZING METALLIC GLASS RIBBONS AND MICA PAPER INTERLAMINAR INSULATION

[75] Inventors: Carl H. Smith, Chatham; Robert M. VonHoene, Basking Ridge, both of N.J.

[73] Assignee: Allied-Signal Inc., Morristownship, Morris County, N.J.

[21] Appl. No.: 524,892

[22] Filed: May 18, 1990

[51] Int. Cl.[5] .............................................. B32B 19/04

[52] U.S. Cl. .................................. 428/363; 242/7.02; 242/7.08; 360/113; 360/125; 428/426; 428/537.5; 428/692

[58] Field of Search ................ 360/113, 125; 428/363, 428/692, 537.5, 426, 900; 242/7.02, 7.08

[56] References Cited

U.S. PATENT DOCUMENTS

| | | | |
|---|---|---|---|
| 3,592,977 | 7/1971 | Lemke | 360/16 |
| 4,308,312 | 12/1981 | Urban | 428/693 |
| 4,418,126 | 11/1983 | Izumi et al. | 428/692 |
| 4,429,016 | 1/1984 | Sugita | 428/692 |
| 4,532,172 | 7/1985 | Fujiyama | 428/692 |
| 4,650,712 | 3/1987 | Hirose | 428/692 |
| 4,683,176 | 7/1987 | Nakamuta et al. | 428/692 |
| 4,921,763 | 5/1990 | Karamon | 428/692 |
| 4,922,156 | 5/1990 | Turcolte et al. | 361/270 |
| 4,994,320 | 2/1991 | Sagielinski | 428/492 |

OTHER PUBLICATIONS

"Investigation of Metglas Toroid Fabrication Techniques . . .", A. Faltens et al., J. of Appl. Phys., 57, No. 1, Apr. 1985, pp. 3508–3510.

"Metallic Glasses for Magnetic Switches", C. H. Smith, IEEE Conf. Record of the 15th. Power Modulator Symposium, pp. 22–27 (1982).

"Thickness Dependence of Magnetic Losses in Amorphous FeBSiC Ribbons . . .", C. H. Smith et al., IEEE Trans. on Magnetics, MAG-20, #5, 9/5/84, 1320–1322.

"Magnetic Properties of Metallic Glasses under Fast Pulse Excitation", C. H. Smith et al., IEEE Conf. Rec. 16th Power Mod. Symp., 240–244 (1984).

*Primary Examiner*—Ellis P. Robinson
*Assistant Examiner*—Archene Turner
*Attorney, Agent, or Firm*—Ernest D. Buff; Gerhard H. Fuchs

[57] ABSTRACT

A magnetic core is fabricated from ferromagnetic metallic glass ribbon and mica paper insulation. The ribbon and insulation are co-wound, so that layers comprise alternate concentric rings. The wound core is then annealed in a vacuum or an inert atmosphere such as dry nitrogen or argon gas. Co-wound cores of this type exhibit excellent magnetic properties at high magnetization rates and high voltage hold off between adjacent laminations, and are particularly suited for pulse power applications.

9 Claims, 3 Drawing Sheets

MAGNETIC CORES UTILIZING METALLIC GLASS RIBBONS AND MICA PAPER INTERLAMINAR INSULATION

BACKGROUND OF THE INVENTION

1. Field of the Invention

This invention relates to a magnetic core fabricated from ferromagnetic metallic glass ribbon; and more particularly to a core provided with interlaminar insulation composed of mica paper.

2. Description of the Prior Art

Magnetic cores utilizing ferromagnetic metallic glass ribbons are used in pulse power applications at very high magnetization rates resulting in induced voltages as great as 100 volts between adjacent laminations of magnetic materials. Without adequate insulation between these laminations, interlaminar eddy currents are generated which result in increased losses and compromise the excellent magnetic properties of the metallic glass ribbons.

To obtain optimum magnetic properties in magnetic cores made from metallic glass ribbons, toroidal cores are first wound in their final configuration and then annealed with a circumferential magnetic field applied to the toroid. This anneals serves to relieve stresses in the metallic glass ribbons resulting both from the rapid quench during casting of the ribbons and from bending stresses in the ribbons due to the curvature of the ribbon in the toroidal core. The applied magnetic field during the anneal serves to induce an easy direction of magnetization along the field direction. By field annealing cores made from metallic glass ribbons, cores with very square B-H loops can be produced.

A square B-H loop, defined as a B-H loop with a high ratio of remanent magnetization to maximum induction, provides maximum change in magnetic flux in the core when it is magnetized from negative remanence to positive maximum induction. The relevant properties of soft magnetic materials for pulse power applications are shown in FIG. 3. The vertical axis 31 is the magnetic induction or B field while the horizontal axis 35 is the applied magnetic field or the H field. The maximum change in induction $\Delta B$ 34 is achieved by first resetting the core by applying a magnetic field to the core in the negative sense. This magnetic field $H_m$ 39 must be several times the coercive field $H_c$ 38. The induction in the core reaches negative maximum induction $-B_m$ 37 when the applied magnetic field is $-H_m$ 39. The core is then allowed to return to negative remanence $-B_r$ 36. When a positive magnetic field is applied, the magnetic induction in the core changes from negative remanence 36 to positive maximum induction $+B_m$ 32. The maximum achievable change in induction $\Delta B$ 34 can be almost as large as twice $B_m$ 32 and is achieved when the loop is very square and $B_r$ 33 is almost as great as $B_m$ 32. A large change in magnetic induction is important in cores used in high power pulse applications. For example, when a core is used as an inductor, toroidal windings are placed around the core. The voltage which can be applied to the windings for a given period of time without the core saturating and inductance of the inductor decreasing depends on the product of the cross sectional area of the core and the change in induction of the magnetic material used in the core. A large change in induction allows the use of a core with a smaller cross sectional area, hence a smaller core volume and weight.

As important as annealing is to achieve the maximum change in induction for pulse power applications, annealing must not degrade any insulation in the core. Therefore, any insulation present in the core before annealing must withstand the anneal temperatures which are typically between 300° C. and 400° C. for 1 to 2 hours for high-induction metallic glass alloys.

Current methods of manufacturing metallic glass cores include dip coatings of metal alkoxides previously developed for polycrystalline magnetic materials as disclosed in U.S. Pat. No. 2,796,364. The use on metallic glasses of magnesium methylate in methyl alcohol, in particular, is disclosed in "Metallic Glasses for Magnetic Switches," by Carl H. Smith published in *IEEE Conference Record of the 15th Power Modulated Symposium,* pages 22-27, copyright 1982, published by Institute of Electrical and Electronic Engineers, 345 East 47th Street, New York, N.Y. 10017. These coatings are annealed to convert the metal alkoxide left on the surface of the ribbon after the solvent has evaporated to a metal oxide coating. Sol-gel coatings of metallic glasses by dip coating the ribbons in colloidal suspensions of silica in alcohol are also used as described in an article "Thickness Dependence of Magnetic Losses in Amorphous FeBSiC Ribbons under Step dB/dt Magnetizations," by C. H. Smith, D. Nathasingh, and H. H. Liebermann published in *IEEE Transactions on Magnetics,* volume MAG-20, number 5, Sept. 5, 1984, pages 1320–1322. While these insulative coatings withstand the temperatures necessary for annealing magnetic cores, both of these insulation methods provide voltage hold off between laminations limited to, at most, tens of volts. This limited voltage hold off is due to the thinness of the coatings which are typically 100 to 200 nm thick combined with the surface roughness of metallic glass ribbons. Therefore, magnetic cores produced using these insulation methods are limited to use in applications which have relatively low magnetization rates which result in only low induced voltages between adjacent laminations of the core.

Other conformal insulations which have been tested on metallic glass cores are vapor deposited refractory oxides such as SiO and $SiO_2$ and Union Carbide Corporation's PARYLENE polymeric film. See for example "Magnetic Properties of Metallic Glasses under Fast Pulse Excitation," by Carl H. Smith and David M. Nathasingh, published in *IEEE Conference Record of the 16th Power Modulator Symposium,* pages 240–244, copyright 1984, published by the Institute of Electrical and Electronic Engineers, 345 East 47th Street, New York, N.Y. 10017. These vapor deposition methods are accomplished in vacuum chambers making it very difficult and expensive to handle the continuous lengths of metallic glasses required for large cores.

Another method of manufacturing metallic glass cores with interlaminar insulation is to co-wind the metallic glass ribbon with a thin polymer tape as is shown in FIG. 2. This method is discussed in "Investigation of Metglas Toroid Fabrication Techniques for a Heavy Ion Fusion Driver," by A. Faltens, S. S. Rosenblum, and C. H. Smith, published in *Journal of Applied Physics,* volume 57, number 1, April 1985, pages 3508–3510. This method of core fabrication provides voltage hold off of several hundred volts per lamination depending on the insulation thickness.

Certain alloys, such as METGLAS ®, alloy 2605CO (Metglas is a registered trademark of Allied-Signal, Inc.) with nominal composition $Fe_{66}Co_{18}B_{15}Si_1$, can be annealed on a supply spool and then carefully rewound with a polymeric insulation into a toroidal core. The relatively high induced magnetic anisotropy energy of this alloy resists the tendency of the interaction between magnetostriction and the strain energy to randomize the magnetization direction within the ribbon and, therefore, to reduce the squareness of the B-H loop. Strain energy results from and the bending stresses in the ribbon which are a result of rewinding the ribbon after annealing. Therefore, cores with magnetic properties almost as good as cores annealed in their final configurations can be produced from high magnetic anisotropy energy ribbons. Since annealing, however, embrittles iron-based alloys, rewinding must be done at a slower speed and with more care than winding of unannealed ribbons.

Metallic glass alloys such as METGLAS alloys 2605SC and 2605S-2 with nominal compositions $Fe_{81}B_{13.5}Si_{3.5}C_2$ and $Fe_{78}B_{13}Si_9$ respectively, having much lower induced magnetic anisotropy energies, cannot be annealed and rewound into cores without significant reduction in the squareness of their B-H loops as compared to B-H loops produced when cores of the same alloys are annealed in their final configurations. Table I shows magnetic properties of three sets of cores of three different metallic glass alloys. Both cores in each set were annealed under appropriate conditions for that alloy. One core in each set was rewound after annealing with 12 μm polyester (MYLAR) tape placed between each 25μ layer of metallic glass ribbon. A decrease in both remanence $B_r$ and maximum induction at 1 Oerstead (80 A/M) $B_1$ is noticeable for each set. The achievable change in induction from $-B_r$ to $+B_1$ is given as ΔB for each core.

TABLE II

| Magnetic properties from dc B-H loops 12 μm KAPTON (polyimide) tape insulation. | | | | |
|---|---|---|---|---|
| Alloy | 2605SC | | 2605CO | |
| Anneal | 365° C./2 hr/10 Oe | | 325° C./2 hr/20 Oe | |
| 12 μm Kapton | no | yes | no | yes |
| $B_1$ (T) | 1.58 | 0.6 | 1.74 | 1.56 |
| $B_r$ (T) | 1.52 | 0.16 | 1.73 | 1.39 |
| ΔB (T) | 3.10 | 0.76 | 3.47 | 2.95 |
| ΔB decrease (%) | | 75 | | 15 |

Therefore, conventional coatings for metallic glass ribbons when annealed, provide good magnetic properties but have relatively low voltage hold off. Conventional methods for co-winding metallic glass ribbons with polymers produce magnetic cores having adequate voltage hold off, but degraded magnetic properties, especially if formed from glass alloys having low induced anisotropy energies. There remains a need in the art for a core insulating method which is suited for use with a variety of metallic glass alloys and which provides magnetic cores with adequate interlaminar insulation and optimal magnetic properties.

SUMMARY OF THE INVENTION

The present invention provides a core having high voltage hold off between laminations and superior magnetic Properties at high magnetization rate and which is efficiently produced by rapidly winding metallic glass ribbon in the unannealed, ductile state, to form a core which is then annealed in its wound configuration. Generally stated, the core comprises a ferromagnetic metallic glass alloy ribbon having at least 80 percent glassy structure and a mica paper insulation. The ribbon and insulation are co-wound to form the core, so that alternate layers thereof are metal and insulation. The core is then annealed in its wound configuration to provide it with a square B-H loop and a high available flux swing. The mica paper insulation provides voltage hold off of over 300 volts, is unaffected by the annealing temperatures, and does not apply stresses to the magnetic ribbon. Cores co-wound with mica paper, as described are especially suited for use with metallic glass ribbons having high magnetostriction and low anisotropy energy. Such cores are appointed for use at high magnetization rates in pulse power applications. Also suited for use as the ribbon component of the cores are nanocrystalline alloys and polycrystalline magnetic alloys.

TABLE I

| Magnetic properties from dc B-H loops. 12 μm MYLAR (polyester) tape insulation. | | | | | | |
|---|---|---|---|---|---|---|
| Alloy | 2605SC | | 2605S-2 | | 2605CO | |
| Anneal | 365° C./2 hr/10 Oe | | 380° C./2 hr/10 Oe | | 325° C./2 hr/20 Oe | |
| MYLAR Tape | no | yes | no | yes | no | yes |
| $B_1$ (T) | 1.59 | 1.26 | 1.46 | 1.30 | 1.72 | 1.61 |
| $B_r$ (T) | 1.54 | 1.10 | 1.42 | 0.97 | 1.71 | 1.61 |
| ΔB (T) | 3.13 | 2.36 | 2.88 | 2.27 | 3.43 | 3.22 |
| ΔB decrease (%) | | 25 | | 21 | | 6 |

Most polymers cannot withstand the annealing temperatures required for metallic glasses. Those which do, such as polyimides, are expensive. Also, polyimides, when co-wound with metallic glass ribbons, tend to apply stresses to the magnetic materials due to differential thermal contraction while cooling after annealing. These stresses tend to degrade the magnetic properties of the cores through the interaction of the stresses with the magnetostriction. See for example the article by Smith and Nathasingh mentioned above.

Magnetic properties measured from dc B-H loops are shown in Table II for METGLAS alloys 2605SC and 2605CO. Two toroids were wound from ribbons of each alloy—one with 12 μm polyimide (KAPTON) tape co-wound with the metallic glass ribbon, and one without the polyimide tape. Cores were then annealed with a magnetic field under appropriate conditions for each alloy. Both cores with polyimide insulation show decreased values of ΔB compared to the cores without polyimide. The decrease is largest in METGLAS Alloy 2605SC which has a smaller induced magnetic anisotropy energy.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

Figure 1:
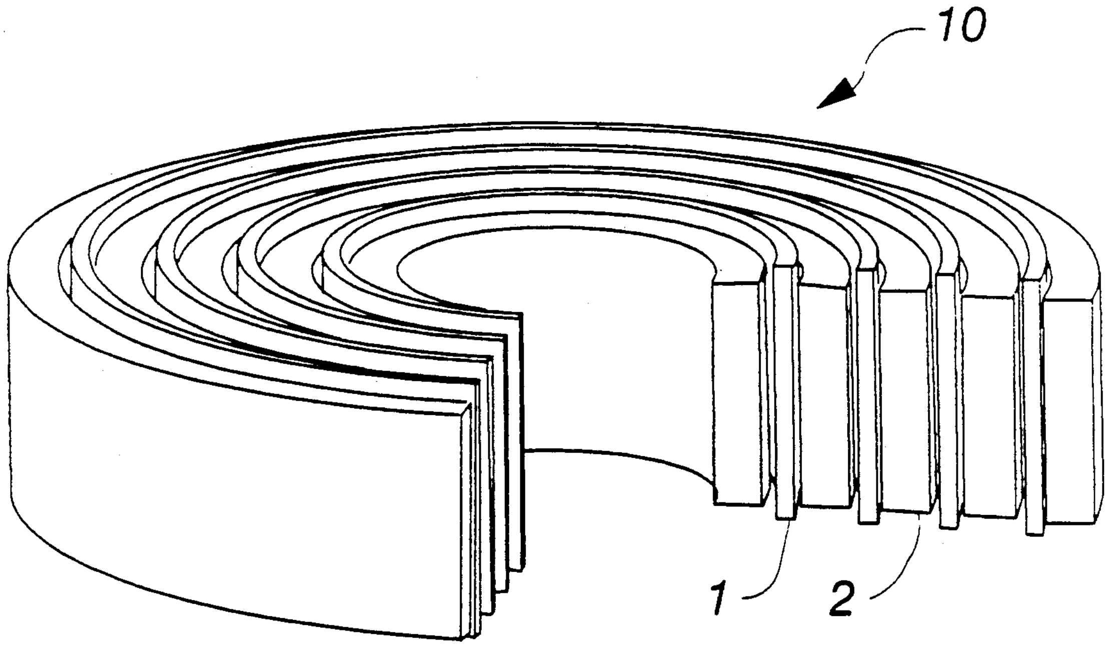
FIG. 1 is a perspective view of an insulated toroidal core with a quarter of the core cut away to show the metallic ribbon and the insulation tape in cross section.
Figure 2:
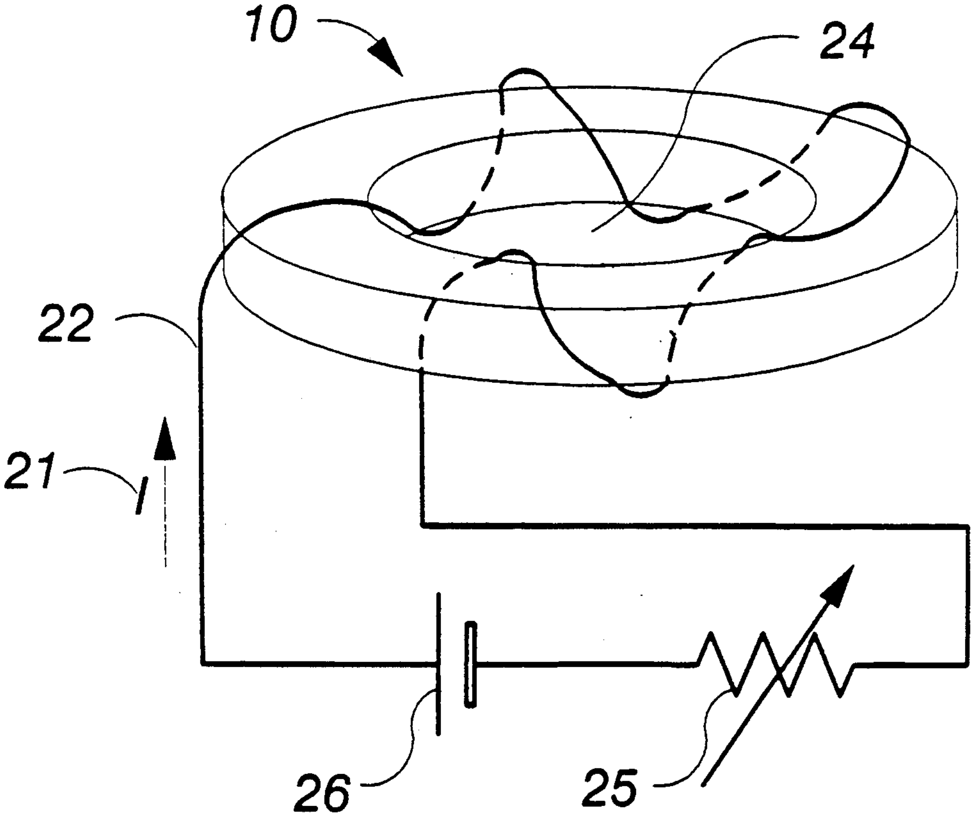
FIG. 2 is a perspective view of a toroidal core showing, schematically, the windings utilized to provide a magnetic field in the core material during annealing.
Figure 3:
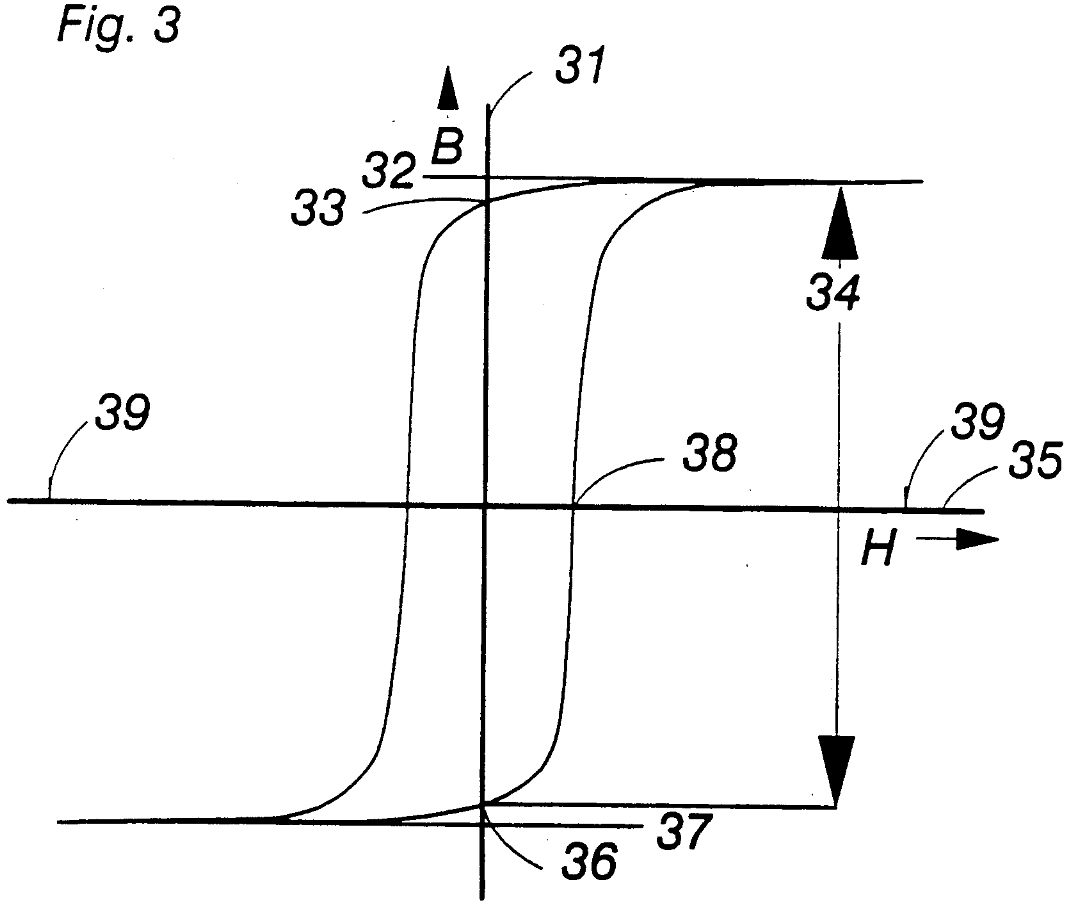
FIG. 3 is a schematic representation of the B-H loop of a soft ferromagnetic material showing relevant properties for pulse power applications, such as remanent magnetization, maximum induction and available flux change.

In accordance with the present invention, there is provided a magnetic core, shown generally at 10 in FIG. 1. Core 10 is fabricated by co-winding metallic glass ribbon 2 approximately 15 to 50 μm in thickness with mica paper insulation 1 approximately 5 to 25 μm in thickness into a toroid. The winding is done such that layers of ribbon 2 and insulation 1 occupy alternate concentric layers. An example of metallic glass ribbon suitable for constructing core 10 is METGLAS Alloy 2605CO. An example of mica paper insulation material suited for constructing core 10 is SAMICA 4100 made by Essex Group, Inc., Newmarket, NH. Mica paper is a homogeneous, flexible sheet of pure mica flakes. Natural mica is first reduced to small flakes and suspended in a fluid. The mica paper is extracted from the fluid on a web and dryed in a process analogous to conventional paper manufacture. Following the winding procedure, the core is annealed in a vacuum or an inert atmosphere such as dry nitrogen or argon gas. A suitable anneal for this alloy comprises the steps of heating the core to a temperature of about 325° C. at a heating rate of about 1° to 10° C. per minute, holding the core at a temperature of about 325° C. for 120 minutes, and then cooling the core at a rate of about 1° to 10° C. per minute. During the entire anneal cycle, or at least during the cooling portion of the anneal cycle, a magnetic field of 800 to 1600 A/m is maintained in the core by passing a current 21 through insulated wire 22 wound around the core 10, as shown in FIG. 2. The magnetic field is calculated by multiplying the current 21 in amperes through the wire 22 times the number of turns of wire which pass completely around the core 10 and through the center 24 of the core 10 divided by the mean circumference of the core 10 in meters. The current is supplied by a voltage source 26 and regulated by a variable resistance 25.

The advantages afforded by co-wound cores constructed in accordance with this invention are apparent when the magnetic characteristics of these cores are compared to those of cores made by conventional methods. High energy pulses typically utilize large voltages. To manipulate these high voltages requires inductors and transformers with magnetic cores which have magnetic flux handling capacity as large as, or greater than, the voltage per turn applied to the windings around the core times the pulse duration. The magnetic flux handling capacity of a core is equal to the cross sectional area of the magnetic material times the maximum change in magnetic induction of the magnetic material.

This invention provides a method for winding magnetic cores from ribbons of these metallic glass alloys. According to the invention, the ribbons in their wound configuration, comprising the core, are provided with superior magnetic properties. Advantageously, ribbons composed of any magnetic alloy can be wound in the unannealed, and therefore less brittle condition, allowing faster winding speeds and fewer interruptions in winding due to breaks in the ribbons.

Table III gives the relevant magnetic properties measured on dc B-H loops of pairs of cores wound with and without mica paper insulation and annealed at the appropriate temperatures. There is very little degradation of the magnetic properties for any of the alloys.

It is clear from comparing the results in Table III to those of the Prior art, that the method of this invention provides cores with a much larger value of available flux swing, ΔB, and considerably less degradation in $B_l$ and $B_r$ than previously available.

TABLE III

Magnetic Properties from dc B-H loops. Cores annealed with and without mica paper insulation.

| Alloy | 2605SC | | 2605S-2 | | 2605CO | |
|---|---|---|---|---|---|---|
| Anneal | 365 C./2 hr/10 Oe | | 380° C./2 hr/10 Oe | | 325° C./2 hr/20 Oe | |
| Mica Paper | no | yes | no | yes | no | yes |
| $B_l$ (T) | 1.63 | 1.56 | 1.53 | 1.49 | 1.79 | 1.78 |
| $B_r$ (T) | 1.60 | 1.38 | 1.22 | 1.37 | 1.71 | 1.69 |
| ΔB (T) | 3.23 | 2.94 | 2.75 | 2.86 | 3.50 | 3.47 |
| ΔB decrease (%) | | 9 | | (4) | | 1 |

Having thus described the invention in rather full detail, it will be understood that such detail need not be strictly adhered to but that further changes and modifications may suggest themselves to those skilled in the art, all falling within the scope of the invention as defined by the subjoined claims.

What is claimed is:

1. A magnetic core having high voltage hold off between laminations and superior magnetic properties at high magnetization rate comprising a ferromagnetic metallic glass alloy ribbon having at least 80% glassy structure and a mica paper insulation, said ribbon and insulation being co-wound to form a core wherein alternate layers are metal and insulation.

2. A core as recited by claim 1, said core having been annealed after winding and having retained its glassy structure.

3. A core as recited by claim 2, wherein said annealing step has been carried out in the presense of an applied magnetic field.

4. A core as recited by claim 1, wherein said metallic glass is a magnetostrictive iron-based alloy.

5. The core as recited by claim 3, wherein the metallic glass has a nominal composition selected from the group consisting of $Fe_{66}Co_{18}B_{15}Si_1$, $Fe_{81}B_{13.5}Si_{3.5}C_2$, and $Fe_{78}B_{13}Si_9$.

6. A core as recited by claim 1, said core having been annealed after winding and said alloy having a crystalline or partially crystalline structure after said annealing.

7. A core as recited by claim 1, wherein said metallic glass is a cobalt-based alloy having saturation magnetostriction less than about 1 part per million.

8. A method for constructing a magnetic core comprising the steps of:

(a) co-winding a ferromagnetic metallic glass alloy ribbon having at least 80% glassy structure and a mica paper insulation to form a core wherein alternate layers are metal and insulation; and (b) annealing said core after said co-winding step.

9. A method as recited by claim 8, wherein said annealing step is carried out in the presence of an applied magnetic field.

* * * * *